United States Patent
Miranda et al.

[11] Patent Number: 6,119,194
[45] Date of Patent: Sep. 12, 2000

[54] METHOD AND APPARATUS FOR MONITORING UNIVERSAL SERIAL BUS ACTIVITY

[75] Inventors: Paul Miranda; Larry Hewitt; David Norris, all of Austin, Tex.; James Bunnell, LaFayette, Colo.

[73] Assignee: Advanced Micro Devices, Inc., Sunnyvale, Calif.

[21] Appl. No.: 09/044,750

[22] Filed: Mar. 19, 1998

[51] Int. Cl.$^7$ .................................................. G06F 13/00
[52] U.S. Cl. .......................................... 710/129; 713/310
[58] Field of Search ........................... 710/100, 62, 128, 710/129; 713/300, 310, 324

[56] References Cited

U.S. PATENT DOCUMENTS

| | | | |
|---|---|---|---|
| 4,811,344 | 3/1989 | Chauvel et al. | 371/15 |
| 5,802,318 | 9/1998 | Murray et al. | 710/100 |
| 5,818,948 | 10/1998 | Gulick | 371/15 |
| 5,841,424 | 11/1998 | Kikinis | 345/168 |
| 5,875,313 | 2/1999 | Sescila, III et al. | 710/129 |
| 5,890,015 | 3/1999 | Garney et al. | 710/62 |
| 5,903,777 | 5/1999 | Brief | 375/211 |

OTHER PUBLICATIONS

Advanced Micro Devices, Inc., "AMD–645 Peripheral Bus Controller Data Sheet", 1997 pp. 1–1 thru 12–2, particularly pp. 1–4 and 2–6.

White Paper "USB—APM Interactions", Intel Corporation, 1997, pp. 1–5.

OpenHC "Open Host Controller Interface Specification for USB", Compaq, Microsoft, National Semiconductor, Jul. 8, 1997, Release 1.0a, pp. ii–152.

"Universal Serial Bus Specification", Compaq, Digital Equipment Corp., IBM PC Company, Intel, Microsoft, NEC, Northern Telecom, Jan. 15, 1996, Revision 1.0, pp. 1–268 and specifically chapters 3–5 and 8–10.

*Primary Examiner*—Glenn A. Auve
*Attorney, Agent, or Firm*—Zagorin, O'Brien & Graham, LLP

[57] ABSTRACT

A USB host controller provides transaction type status signals indicating USB activity type. The status signals include a bulk status bit signal indicative of bulk activity on a USB, a control status bit signal indicative of control activity on the USB, an isochronous status bit signal indicative of isochronous activity on the USB and an interrupt status bit signal indicative of an acknowledged interrupt on the USB. In addition a programmable mask register is provided for masking any or all of the status bits. The status bits may be combined and provided as a single signal indicative of USB activity.

31 Claims, 6 Drawing Sheets

METHOD AND APPARATUS FOR MONITORING UNIVERSAL SERIAL BUS ACTIVITY

BACKGROUND OF THE INVENTION

1. Field of the Invention

This invention relates to a host controller for the Universal Serial Bus (USB) and more particularly to monitoring of USB activity.

2. Description of the Related Art

The Universal Serial Bus (USB) provides a way to attach and access peripheral devices through a common interface over a serial bus in a personal computer (PC) system. The USB was intended to reduce overall cost and simplify the attachment and configuration of peripheral devices from the end-user perspective. In older (also referred to as legacy) personal computer systems, peripheral devices were typically mapped into the central processing unit's (CPU's) input/output space and assigned a specific interrupt request (IRQ) line. In some cases, the peripheral device also received a direct memory access (DMA) channel. These system resources were assigned to particular peripheral devices by various personal computer manufacturers and became the standard input/output locations, IRQs and DMA channels used by software developers to access a given device.

The USB breaks away from the resource problems associated with legacy PC input/output implementations. Instead, the USB provides an input/output port where several types of devices can be connected simultaneously and occupy the same hardware resources. The devices range from keyboards to printers to cameras. The USB relies heavily on system software to transfer data between the peripheral device and applications programs requiring use of the peripheral device. Each device on the USB is assigned an address known only to the USB software and thus does not consume additional hardware system resources in the manner typical of legacy PC architectures.

In many computer systems, power savings features are utilized to reduce power consumption to extend battery life in e.g., laptop systems or to reduce power consumption to reduce operating costs of the system. Systems incorporating such power saving features typically operate in several reduced power modes where one or more parts of the system are turned off. In typical existing low power designs, hardware which is not controlled by the operating system, monitors system activity and determines the appropriate power state for the computer system. Systems typically measure system activity by monitoring peripheral activity including interrupts and accesses to specific input/output locations. System hardware uses such system activity to appropriately enter and exit from various power states.

For example, when the PC is in a low power state, keyboard activity typically causes the PC to wake up from its low power state. On the other hand, many notebook computers are designed to automatically suspend when no activity is detected. Thus, inactivity of the mouse and keyboard, along with other inactive resources, cause the system to go into a low power state. In a legacy system, the specific input/output location, IRQs and DMA channels can be readily monitored by hardware to determine activity.

However, in a USB system, only software and the actual peripherals connected to the USB know where USB transactions are directed. So there is no way for the hardware to readily identify which particular USB device, if any, is active. From a power management perspective, one solution is to ignore USB activity. However, that can result in the computer system suspending in the middle of a mouse or keyboard operation.

Another solution is to have activity on the USB cause the system to wake up. However, because the hardware cannot distinguish activity on the bus that is relevant to power management from activity that is not, such a solution may prevent the system from entering a low power state. For example, if the system wakes up from a low power state because of any USB activity, even such activity as unacknowledged interrupts will cause the system to wake up. That is because on the USB, the USB host controller periodically polls devices to see if an interrupt is pending on the device. If so, the polled device will acknowledge the interrupt. If the device has no interrupt pending, then the device will not acknowledge the interrupt. If any activity on the USB causes a wake up operation, then even unacknowledged interrupts from the keyboard indicating no keyboard activity, would be considered USB activity and an unwanted wake up operation would occur. It can be seen, therefore, that it is desirable to integrate the USB into power management in a more useful manner.

SUMMARY OF THE INVENTION

Accordingly, the invention provides a low cost way to provide more useful information on USB activity. In one embodiment of the invention, a transaction type status register is provided for a USB host controller which includes a bulk status bit signal indicative of bulk activity on the USB, a control status bit signal indicative of control activity on the USB, an isochronous status bit signal indicative of isochronous activity on the USB and an interrupt status bit signal indicative of an acknowledged interrupt on the USB. In addition a programmable mask register is provided for masking any or all of the status bits. The status bits may be combined and provided as a single signal indicative of USB activity.

BRIEF DESCRIPTION OF THE DRAWINGS

The present invention may be better understood, and its numerous objects, features, and advantages made apparent to those skilled in the art by referencing the accompanying drawings, where the use of the same reference symbols in different drawings indicates similar or identical items.

DESCRIPTION OF THE PREFERRED EMBODIMENT(S)

Figure 1:
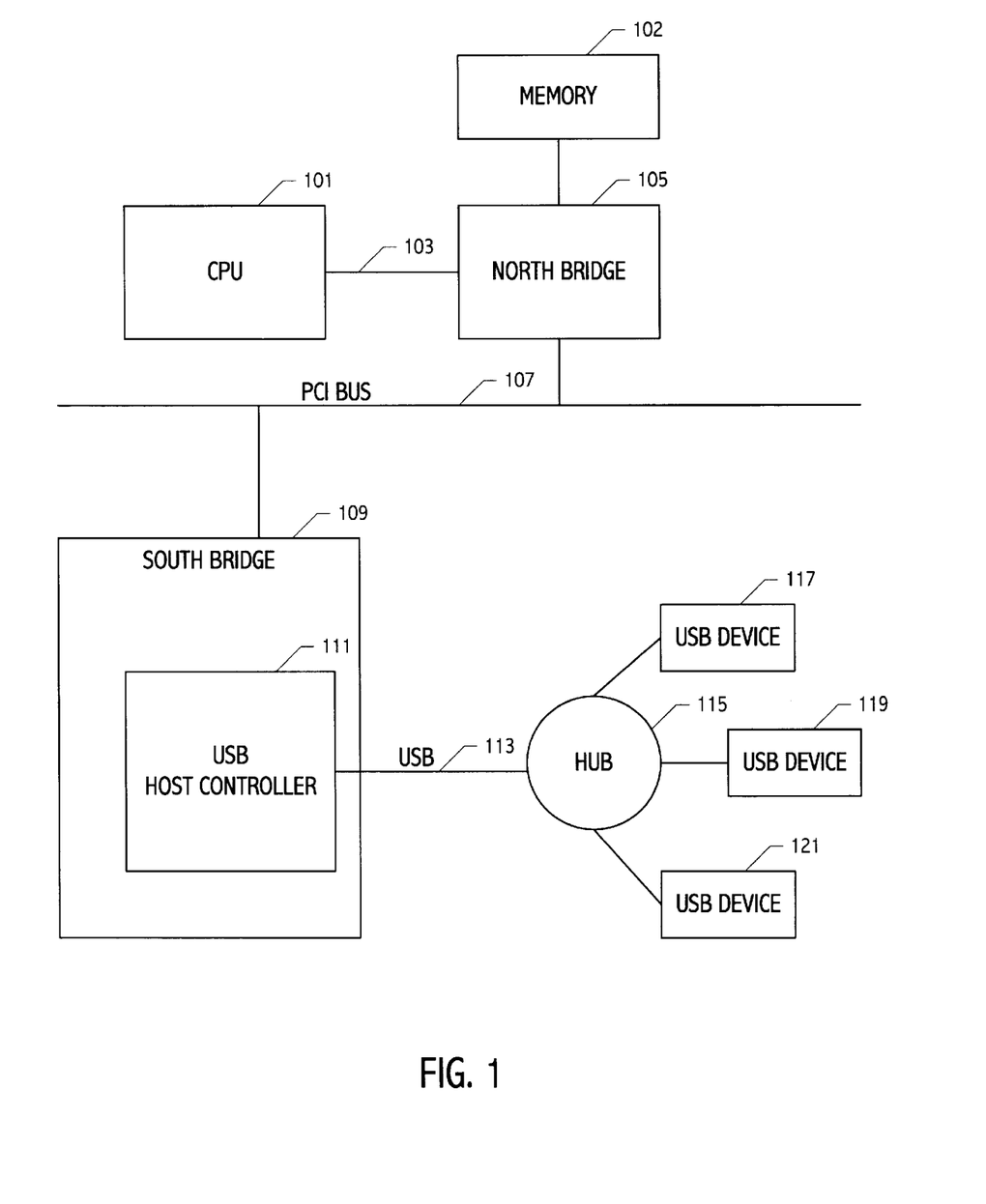
FIG. 1 shows a computer system including a USB and a USB host controller, incorporating the present invention.

Referring to FIG. 1, a system embodying the present invention is shown. CPU 101 is coupled to north bridge circuit 105 via host bus 103. The north bridge circuit provides memory management functions for memory 102 as well as a bridge to peripheral component interconnect (PCI) bus 107. South bridge integrated circuit 109 is coupled to PCI bus 107. Residing on south bridge 109 is USB host controller 111 which is coupled via USB 113 to USB hub 115 and USB devices 117, 119 and 121. Further details on the USB can be found in the "Universal Serial Bus Specification", Revision 1.0, by Compaq et al., Jan. 15, 1996, which is incorporated herein by reference. In the embodiment shown, the USB host controller 111 is compatible with the "Open Host Controller Interface Specification for USB (OpenHC)" by Compaq, Microsoft and National Semiconductor, Release 1.0a Jul. 8, 1997, which is incorporated herein by reference.

There are four kinds of data transfer types on the USB. In addition, the data transfer types are also classified as periodic or non-periodic. One type of transfer is interrupts which are small transfers used to communicate information from a USB device, such as a keyboard, to the system. Interrupt transfers are classified as periodic transfers. The host controller polls the USB device at periodic intervals. The rate of polling should be at a rate sufficient for the device being polled. Thus, for example, a keyboard is polled at a rate sufficient for the system to respond satisfactorily to keyboard activity.

A second type of period transfers are isochronous transfers which transfer time sensitive periodic data, e.g., audio data.

A third type of transfer are control transfers which are non periodic transfers. Control transfers send configuration, command, and status information between the host controller and USB device. For example, providing modem configuration information to a modem on the USB is an example of a control transfer across the USB.

A fourth of data transfer type are bulk transfers. Bulk transfers are non periodic transfers for large amounts of data. An exemplary bulk transfer is sending data to a printer on the USB.

Figure 2:
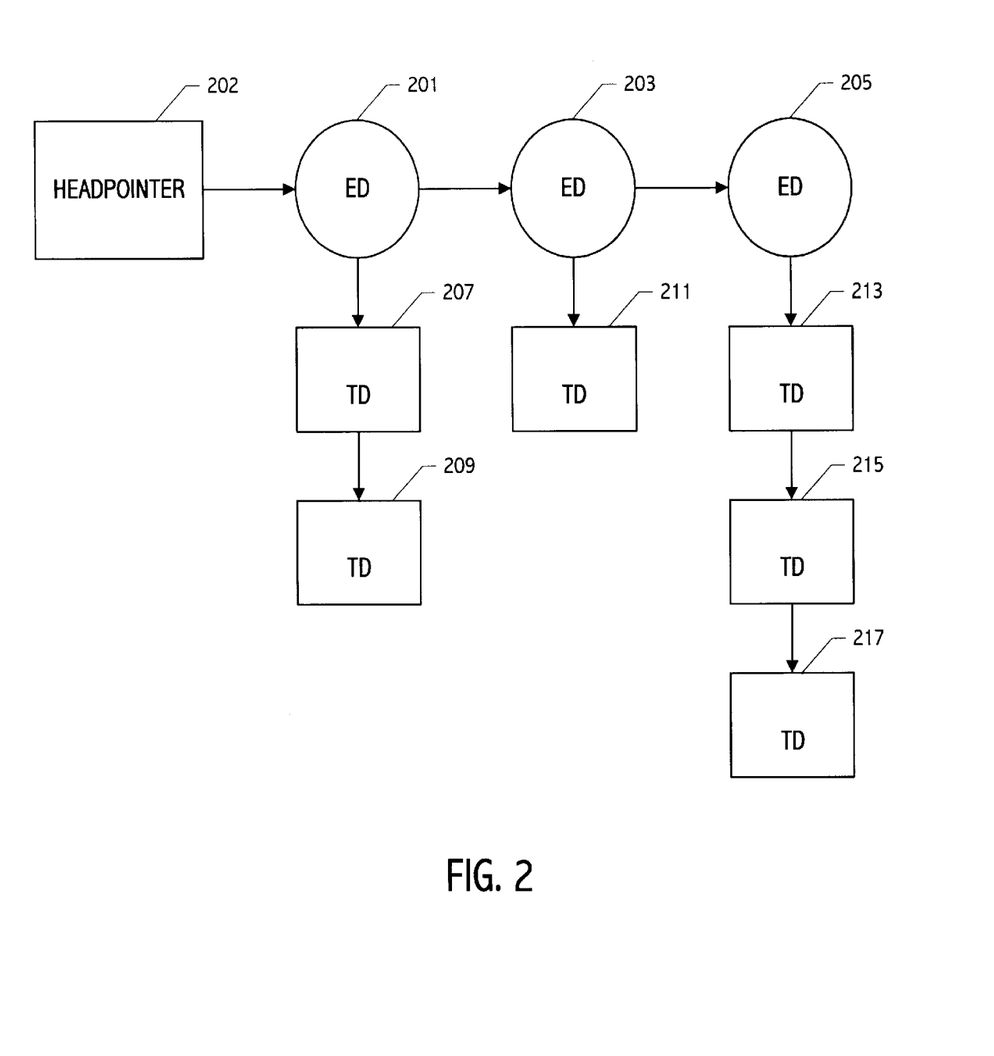
FIG. 2 shows a typical list structure of Endpoint Descriptors and Transfer Descriptors used in the USB host controller.

The USB host controller utilizes Endpoint Descriptors (ED) and Transfer Descriptors (TD) for communicating across the USB. An Endpoint Descriptor is assigned to each endpoint in the system and contains information which the host controller needs to communicate with the device. Such information includes maximum packet size, endpoint address, speed of the endpoint and data flow direction. Referring to FIG. 2, endpoint descriptors 201, 203 and 205 are shown to be connected in a linked list structure. Headpointer 202 points to the linked list of Endpoint Descriptors. A list of Transfer Descriptors (TD) 207–217 is shown coupled to the Endpoint Descriptors. The Transfer Descriptors contain information relating to the data packets to be transferred. The list of Transfer Descriptors functions as a queue with the first Transfer Descriptor in the list being the first one processed.

Figure 3:
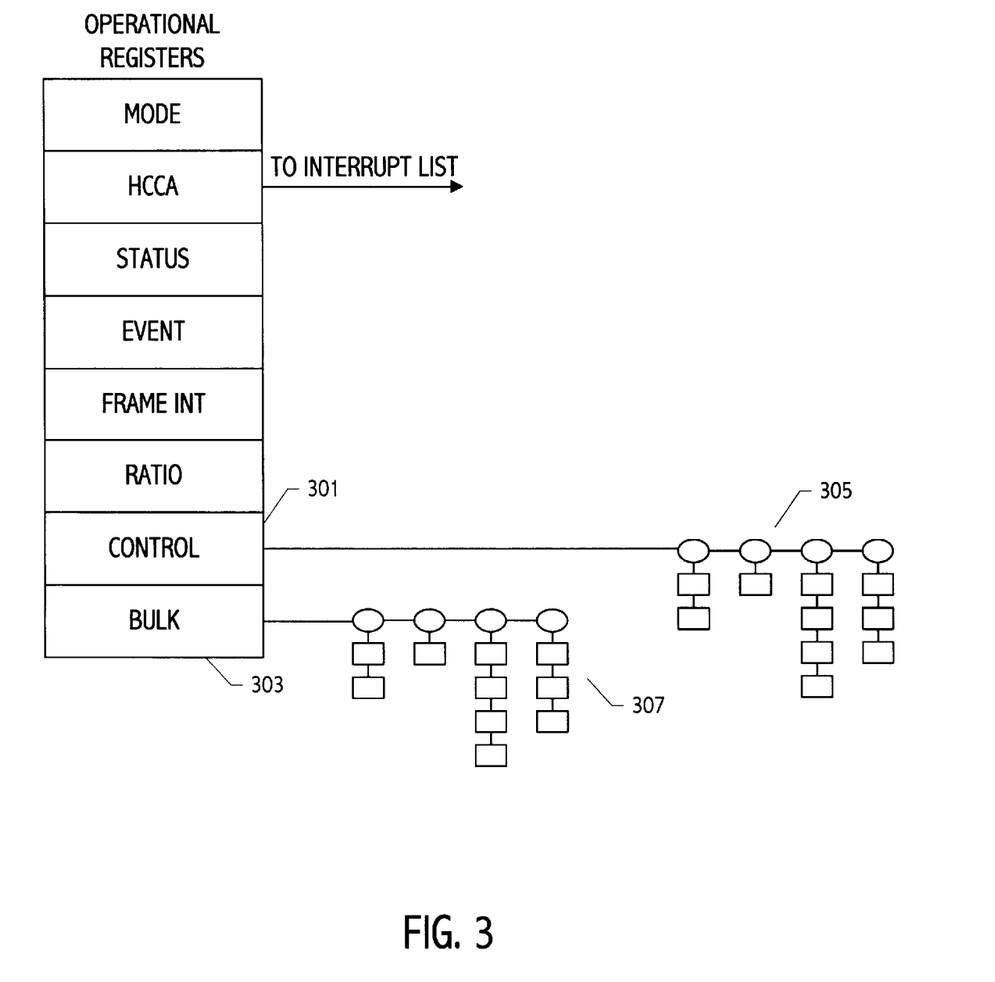
FIG. 3 shows operational registers having headpointers pointing to bulk, control and periodic lists.

As shown in FIG. 3, operational registers provide separate headpointers 301 and 303 for the control Endpoint Descriptor linked lists 305 and 307, for control and bulk transfers, respectively. The periodic transfers (interrupt and isochronous) are combined in a single list pointed to by a pointer in the Host Controller Communications Area (HCAA). The other operational registers are not necessary for understanding of the present invention.

Figure 4:
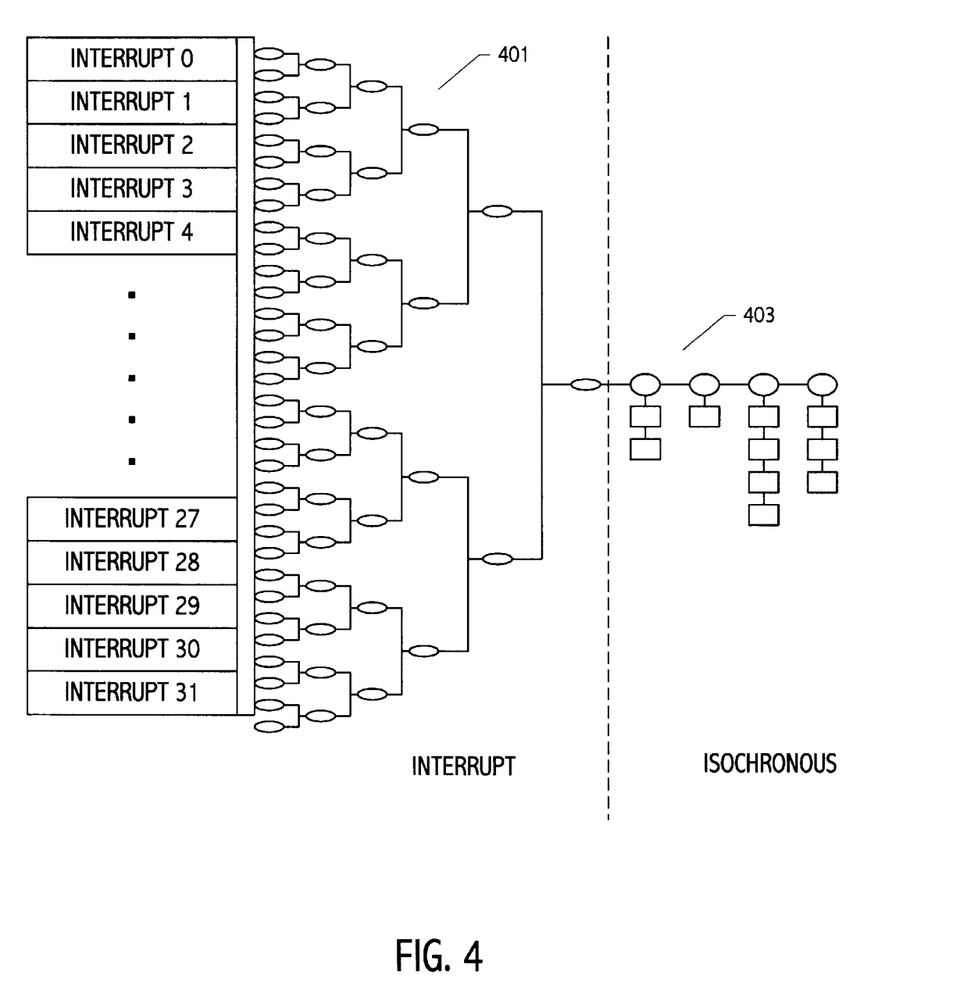
FIG. 4 shows the structure of the periodic list including the interrupt tree structure followed by the isochronous Endpoint Descriptors and Transfer Descriptors.

The interrupt Endpoint Descriptors, which are organized into a tree structure 401 as shown in FIG. 4, are processed first in the periodic list. Once the appropriate interrupt Endpoint Descriptors have completed processing, the isochronous Endpoint Descriptors 403 are processed.

Description of the USB and the host controller is limited to that necessary to understand the present invention. Additional details on the USB, the host controller and the Endpoint Descriptors and Transfer Descriptors can be found in the Open HCI and USB specifications mentioned above.

The host controller indicates when it has completed servicing a particular Transfer Descriptor. In addition, the host controller knows at that time whether it is servicing a control list, a bulk list or the periodic list of Endpoint Descriptors. In addition, if it is servicing the periodic list, the host controller determines from the Endpoint Descriptors whether the host controller is traversing interrupt Endpoint Descriptors or isochronous Endpoint Descriptors.

In order to provide better information on USB activities for power management functions within the computer system, the host controller provides information as to the type of transfer that just completed. That is, the host controller indicates if the transfer is bulk, control, interrupt or isochronous. In addition, if an interrupt transfer occurred, the host controller knows if the interrupt token was acknowledged, indicating that a USB device is ready to transfer information. That information can be used by power management logic, residing in the south bridge integrated circuit, to wake up the system when, e.g., a keyboard, mouse or modem requires service.

Figure 5:
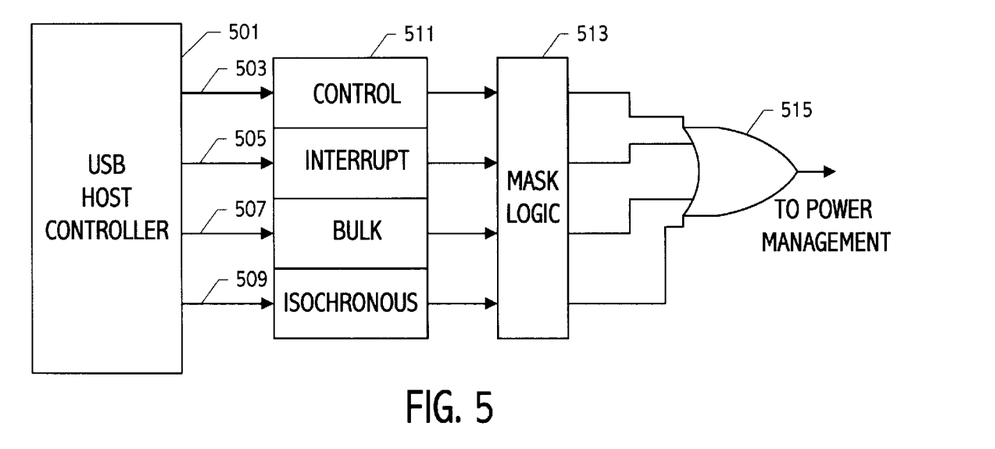
FIG. 5 shows a block diagram of the host controller with status bits being provided through a mask register for use by power management logic.

Referring to FIG. 5, the USB host controller 501 provides four status signals to identify the transaction type on the USB. They are control status signal 503, interrupt status signal 505, bulk status signal 507 and isochronous status signal 509. The status signals are provided as pulses in one embodiment of the invention, which can be loaded into transaction type status register 511. Each status bit in status register 511 is ANDed with the appropriate mask bits in mask logic 513 which includes both the mask register and the AND gates. Those bits are then combined in OR gate 515. The polarity of the mask bits is of course implementation dependent. The resultant signal from OR gate 515 provides a signal which indicates activity on the USB. That signal can be provided to power management logic to cause the system to enter a different power state.

Preferably, the mask bits are software programmable so different applications can use any or all of the four status bits to cause appropriate power management operations. Thus, for example, a system may choose to have only acknowledged interrupts cause wake up events in the system.

Figure 6:
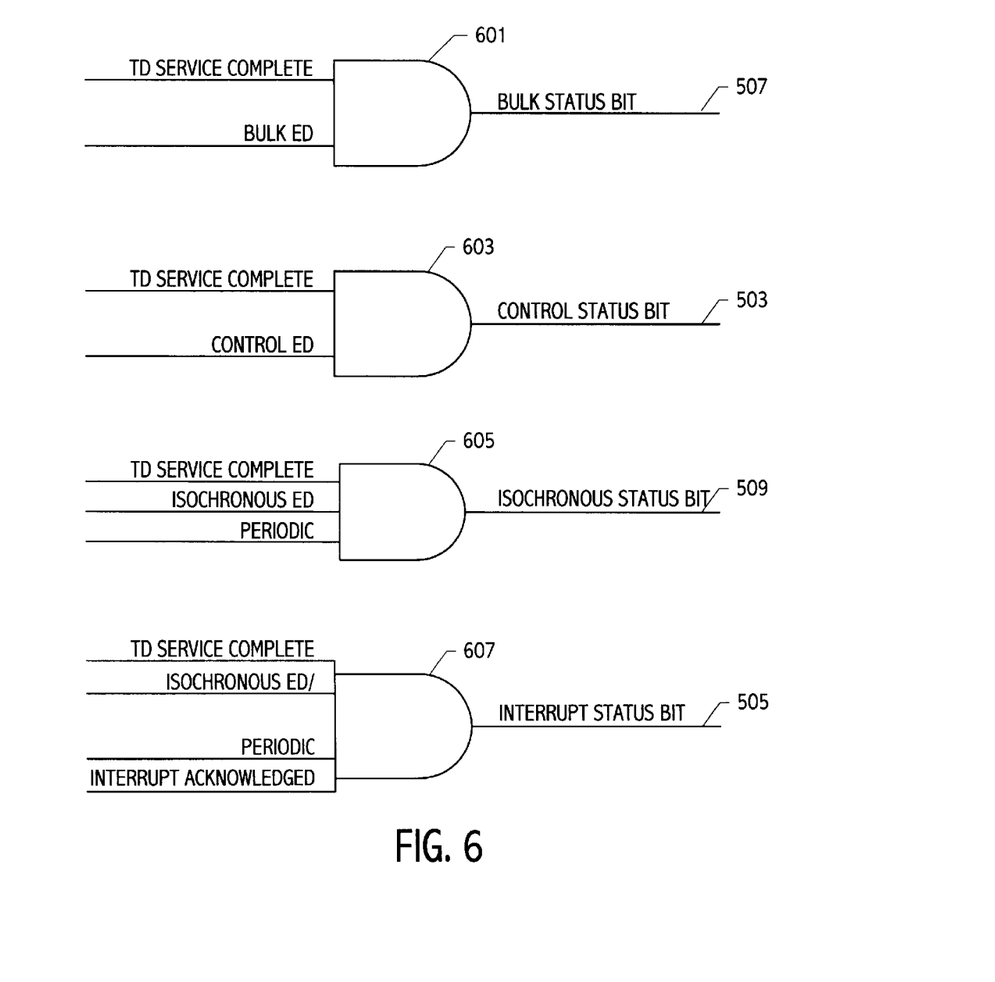
FIG. 6 shows details of generation of the status bits.

Referring to FIG. 6, details are shown for creating each of the status bits. The host controller provides a signal (TD service complete) indicating when an attempted transfer of data described by a particular Transfer Descriptor for any of the four types of data has completed. The TD service complete signal is asserted even if error conditions arise. In one embodiment, the TD service complete signal is a pulse signal the width of a PCI clock. Thus, each of the status bits is provided as pulses of the same width. In addition, the host controller maintains a set of signals indicating which of the Endpointer Descriptor lists is being traversed. Thus, when TD service complete is asserted and a signal indicating that the bulk Endpoint Descriptor list is being traversed, those signals are logically combined in AND gate 601 to produce the bulk status bit 507. Similarly, when TD service complete is asserted and a signal indicating that the Control Endpoint Descriptor list is being traversed, those signals are logically combined in AND gate 603 to produce the control status bit 503.

The isochronous status bit 509 is generated by ANDing the TD service complete signal and a signal indicating that the periodic Endpoint Descriptor list is being traversed, along with a signal indicating that an isochronous Endpoint Descriptor has been detected (Isochronous ED) while traversing the periodic Endpoint Descriptor list. That is, the host controller detects that it has traversed the periodic list to the Endpoint Descriptors 403 (FIG. 4). Those three signals are logically combined in AND gate 605 to generate the isochronous status bit.

The interrupt status bit 505 is generated by ANDing together the TD Service Complete signal, the signal indicating that the periodic Endpoint Descriptor list is being traversed, and the signal indicating that an isochronous Endpoint Descriptor has not been detected while traversing the periodic Endpoint Descriptor list (still in region 401). In addition, because not all interrupt polls are acknowledged, and it is undesirable to cause power management logic to respond to every unacknowledged interrupt poll operation, a signal indicating that an interrupt has been acknowledged is also ANDed in AND gate 607 to provide interrupt status bit 505.

Figure 7:
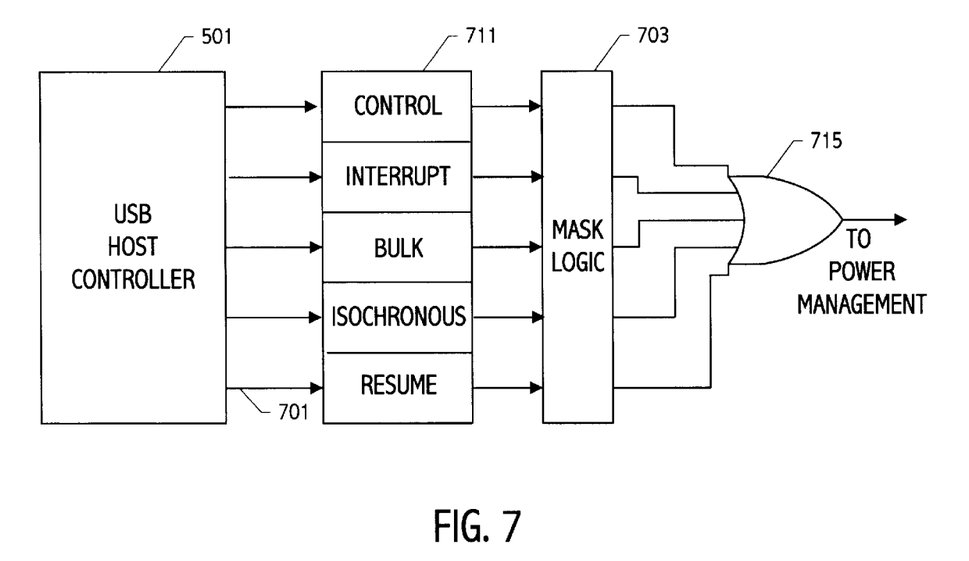
FIG. 7 shows an embodiment in which a resume status bit is included.

Referring to FIG. 7, another embodiment of the invention is shown in which a resume status signal 701 is provided by host controller 501, in addition to the status signals previously described. The resume status signal indicates that a USB device has signaled a resume condition while the USB is in a suspend state (inactive). Details of resume and suspend states on the USB are known to those of skill in the art. The resume status signal is stored in status register 711, masked as desired in mask logic 703 and provided to power management logic through OR gate 715.

Figure 8:
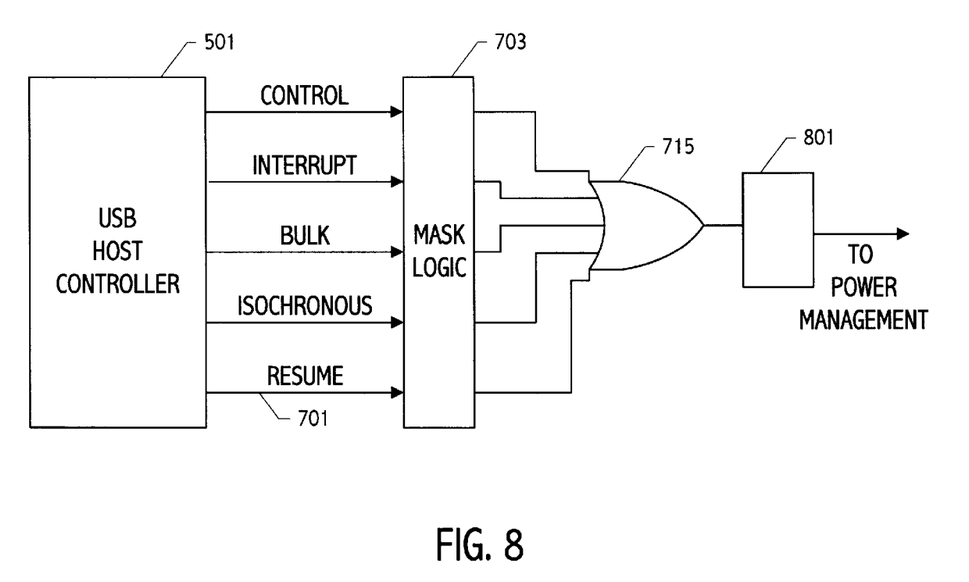
FIG. 8 shows an embodiment in which a single status bit is provided as an OR of all status signals.

Referring to FIG. 8, another embodiment is shown in which the status register is a single bit 801. Thus, the control, interrupt, bulk, isochronous and resume status signals provided from host controller 501 are provided directly to mask logic 703, through OR gate 715 and then to a single bit storage element 801.

Using the approach described herein, a USB host controller has been modified with minimum hardware impact to provide more information on USB activities to power management functions within the system. Thus, power management logic can better determine in a variety of circumstances when to go into appropriate power savings states and when to resume operations out of the various power savings states.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. An apparatus comprising:
   a transaction type status register for a Universal Serial Bus (USB) host controller indicating a type of transaction on a USB, the status register including status bits corresponding to,
   a first status bit signal indicative of bulk activity on the USB,
   a second status bit signal indicative of control activity on the USB,
   a third status bit signal indicative of isochronous activity on the USB, and
   a fourth status bit signal indicative of an acknowledged interrupt on the USB,
   the first, second, third and fourth status bit signals being coupled to the transaction type status register;
   mask logic including a programmable mask register, said mask register including a mask bit for each of the status bits and wherein the mask logic further includes logic circuits logically combining respective mask bits and status bit signals to provide programmably masked status bits; and
   a power management circuit coupled to the programmably masked status bits, the power management logic responsive to the programmably masked status bits to generate a wake-up signal, indicating to a computer system to come out of a reduced power state.

2. The apparatus as recited in claim 1 wherein the programmably masked status bits are coupled to the power management circuit through a logic gate logically combining the programmably masked status bits to provide a resultant signal indicative of USB activity to the power management circuit.

3. The apparatus as recited in claim 1 wherein the first, second third and fourth status bit signals are provided as pulses.

4. The apparatus as recited in claim 1 further comprising a bulk logic circuit logically combining a transfer descriptor service complete signal, indicating that a transfer descriptor has been serviced, and a bulk end point signal, indicating that a bulk end point is being serviced, thereby generating the first status bit signal.

5. The apparatus as recited in claim 4 further comprising a control logic circuit logically combining the transfer descriptor service complete signal and a control end point signal indicating that a control end point is being serviced, thereby generating the second status bit signal.

6. The apparatus as recited in claim 5 further comprising an isochronous logic circuit logically combining the transfer descriptor service complete signal, an asserted isochronous endpoint detected signal indicating that an isochronous list is being serviced and a periodic signal indicating that periodic list is being serviced, thereby generating the third status bit signal.

7. The apparatus as recited in claim 6 further comprising an interrupt logic circuit logically combining the transfer descriptor service complete signal, a deasserted isochronous endpoint detected signal indicating that an isochronous list is not being serviced and a periodic signal indicating that periodic list is being serviced, and an interrupt acknowledge signal indicating that an interrupt operation on the USB was acknowledged, thereby generating the fourth status bit signal.

8. The apparatus as recited in claim 1 wherein the transaction type status register further includes a status bit corresponding to a fifth status bit signal indicative of a resume state on the USB.

9. A method comprising:
   providing a bulk status signal indicative of bulk activity on a USB;
   providing a control status signal indicative of control activity on the USB;
   providing an isochronous status signal indicative of isochronous activity on the USB;
   providing an interrupt status signal indicative of an acknowledged interrupt on the USB;
   logically ANDing the bulk, control, isochronous and interrupt status signals with a respective first, second, third and fourth programmable mask signal to provide a fifth, sixth, seventh and eighth signal, respectively, thereby providing programmably masked values of the status signals; and supplying the programmably masked values to a power management circuit; and generating a wake-up in the power management circuit for a computer system according to the programmably masked values of the status signals, thereby waking up the computer system in response to USB activity indicated by the programmably masked values of the status signals.

10. The method as recited in claim 9 further comprising:
coupling the programmably masked values to the power management circuit by logically ORing the fifth, sixth, seventh and eighth signals, to provide an Ored signal indicative of USB activity to the power management circuit.

11. The method as recited in claim 9 wherein the bulk status signal is generated by logically combining a transfer descriptor service complete signal, indicating that a transfer descriptor has been serviced, and a bulk end point signal indicating that a bulk end point is being serviced.

12. The method as recited in claim 11 wherein the control status signal is generated by logically combining the transfer descriptor service complete signal and a control end point signal indicating that a control end point is being serviced.

13. The method as recited in claim 12 wherein the isochronous status signal is generated by logically combining the transfer descriptor service complete signal, an asserted isochronous end point detected signal indicating that an isochronous list is being serviced and a periodic signal indicating that periodic list is being serviced.

14. The method as recited in claim 13 wherein the interrupt status signal is generated by combining the transfer descriptor service complete signal, a deasserted isochronous end point detected signal indicating that an isochronous list is not being serviced, the periodic signal indicating that periodic list is being serviced, and an interrupt acknowledge signal indicating that an interrupt was acknowledged.

15. The method as recited in claim 9 wherein the first, second, third and fourth mask signals are provided from a programmable mask register.

16. An apparatus for providing an indication of Universal Serial Bus (USB) activity, comprising:

first means for determining bulk activity on a USB and providing a bulk status signal as an indication thereof;

second means for determining control activity on the USB and providing a control status signal as an indication thereof;

third means for determining isochronous activity on USB and providing an isochronous status signal as indication thereof; and fourth means for determining interrupt activity on the USB and providing an interrupt status signal as indication thereof.

17. The apparatus as recited in claim 16 further comprising:

means for programmably masking the bulk, control isochronous and interrupt status bits;

and a logic gate for combining outputs from the masking means and providing as an output a combined signal indicating USB activity.

18. A computer system comprising:
a processor;
a Universal Serial Bus (USB) host controller circuit coupled to a USB and communicatively coupled to the processor; and wherein the USB host controller circuit providing,
a bulk status bit signal indicative of bulk activity on the USB;
a control status bit signal indicative of control activity on the USB;
an isochronous status bit signal indicative of isochronous activity on the USB;
an interrupt status bit signal indicative of an acknowledged interrupt on the USB; and
mask logic coupled to the status bit signals, the mask logic for programmably masking each of the status bit signals and generating programmably masked status bit signals indicative thereof; and
a power management circuit logically coupled to the masked status bit signals, the power management circuit generating a wake-up for the computer system, according to values of the programmably masked status bit signals.

19. The computer system as recited in claim 18 further comprising:
a first bridge integrated circuit connected between the processor and an input/output bus; and
a second bridge integrated circuit coupled to the input/output bus; and
wherein the host controller is disposed on the second integrated circuit.

20. The computer system as recited in claim 18 further comprising:
a logic circuit coupled to the masked status bit signals and the power management circuit for logically ORing the programmably masked status bit signals and providing an output indicative of USB activity to the power management circuit.

21. The computer system as recited in claim 20 further comprising a status register coupled between the mask logic and the status bit signals.

22. The computer system as recited in claim 20 further comprising a status bit for storing the output indicative of USB activity.

23. The computer system as recited in claim 18 wherein the USB host controller circuit further provides a resume status bit signal indicative of resume activity on the USB.

24. An apparatus comprising:
a plurality of status bits indicating a transaction type for USB activity;
a mask circuit, including programmable mask bits, coupled to the plurality of status bits for programmably masking the status bits and providing masked status bits indicative thereof; and
power management logic coupled to receive information indicative of the masked status bits, the power management logic being responsive to the information to generate a wake-up in a computer system according to the information received, thereby providing for selective generation of the wake-up according to the programmable mask bits and the status bits.

25. The apparatus as recited in claim 24 wherein the status bits include a first status bit indicative of bulk activity on the USB, a second status bit indicative of control activity on the USB, a third status bit signal indicative of isochronous activity on the USB, and a fourth status bit signal indicative of an acknowledged interrupt on the USB.

26. The apparatus as recited in claim 25 further comprising a logic gate logically combining the masked status bits and providing a signal indicative thereof to the power management logic as the information indicative of the masked status bits.

27. An integrated circuit comprising:

a plurality of status bits indicating a transaction type for USB activity, a first status bit indicating an acknowledged interrupt on the USB; and power management logic coupled to receive information indicative of the status bits, the power management logic being responsive to the information to generate a wake-up in a computer system according to the information received.

28. The integrated circuit as recited in claim 27 wherein the status bits further include a second status bit indicative of bulk activity on the USB, a third status bit indicative of control activity on the USB, and a fourth status bit indicative of isochronous activity on the USB.

29. A method of generating a wakeup event in a computer system that includes a Universal Serial Bus (USB), the method comprising:

determining a type of transfer that occurred on the USB and generating a plurality of status signals indicative thereof;

providing information indicative of the status signals to power management logic; and in the power management logic, causing a wake-up in the computer system according to the information; and wherein the status signals include a first status bit indicative of bulk activity on the USB, a second status bit indicative of control activity on the USB, a third status bit signal indicative of isochronous activity on the USB, and a fourth status bit signal indicative of an acknowledged interrupt on the USB.

30. The method as recited in claim 29 further comprising selectively masking status bits according to a programmable mask register.

31. The method as recited in claim 30 further comprising providing at least one signal indicative of the selectively masked status bits to the power management logic as the information indicative of the status signals.

* * * * *